Jan. 29, 1974  D. R. BAKER ETAL  3,788,876
CARTON BLANKS PRINTED WITH A HEAT SEALABLE COMPOSITION
AND METHOD THEREOF
Filed July 16, 1971  2 Sheets-Sheet 1
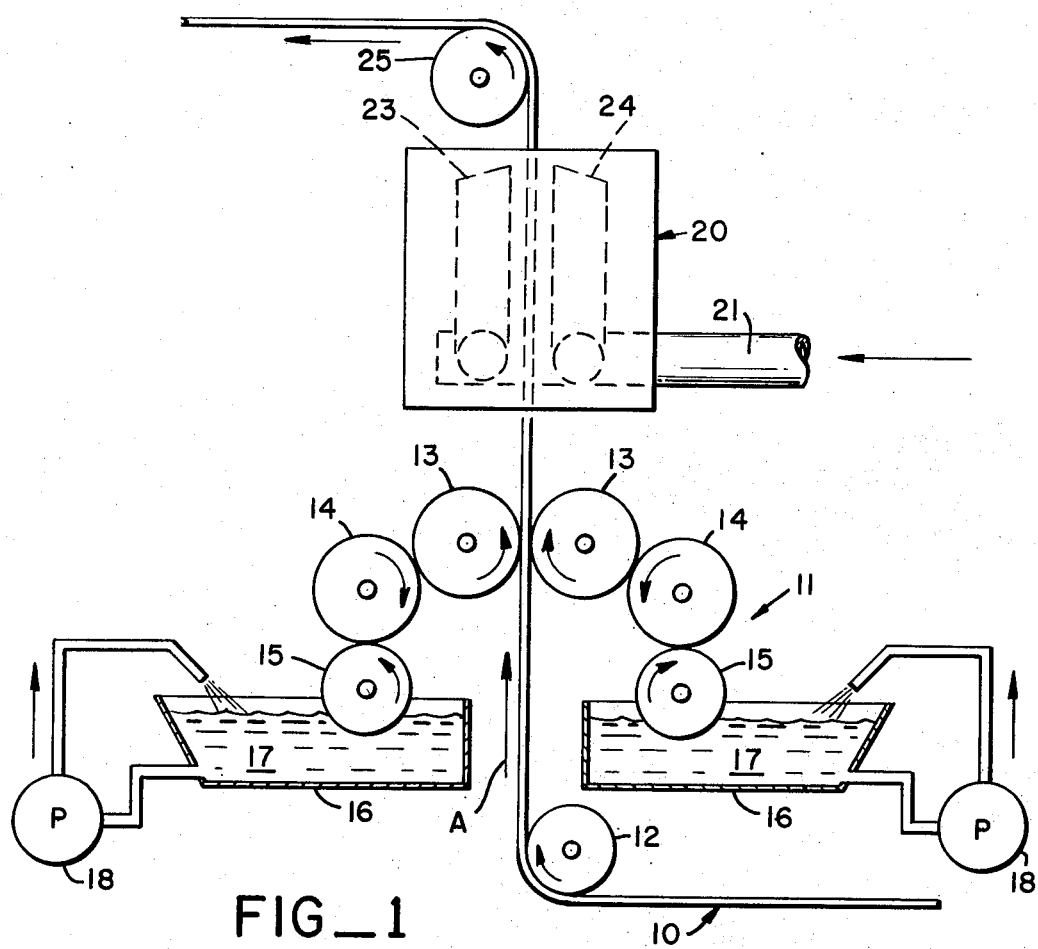
FIG_1
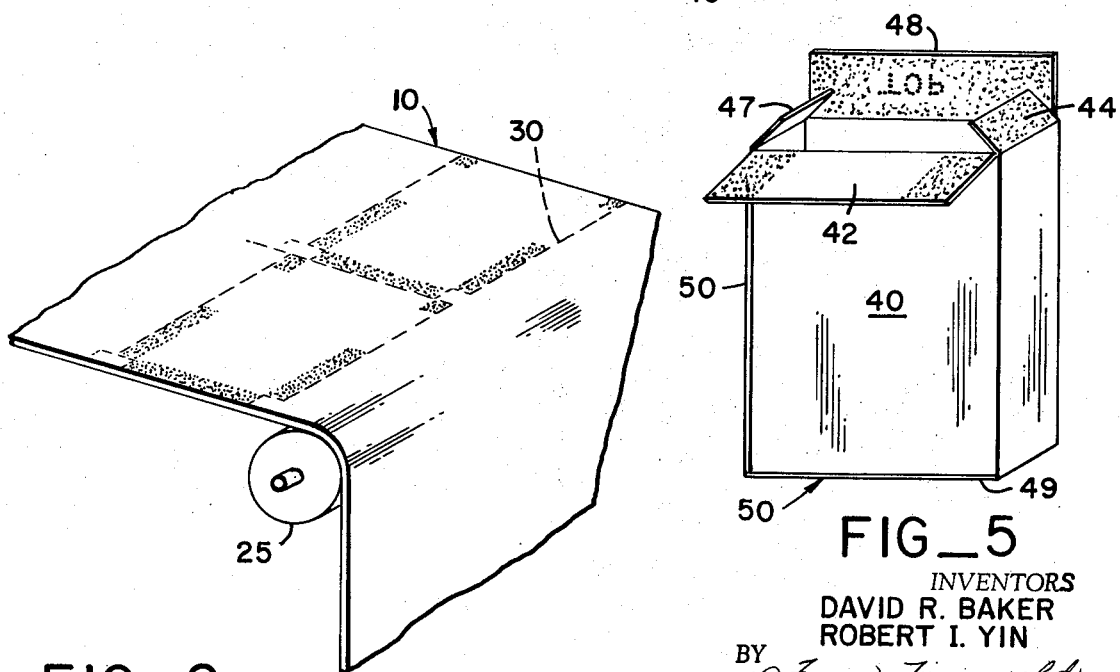
FIG_2
FIG_5
INVENTORS
DAVID R. BAKER
ROBERT I. YIN
BY
ATTORNEYS Jan. 29, 1974  D. R. BAKER ETAL  3,788,876
CARTON BLANKS PRINTED WITH A HEAT SEALABLE COMPOSITION
AND METHOD THEREOF
Filed July 16, 1971                         2 Sheets-Sheet 2
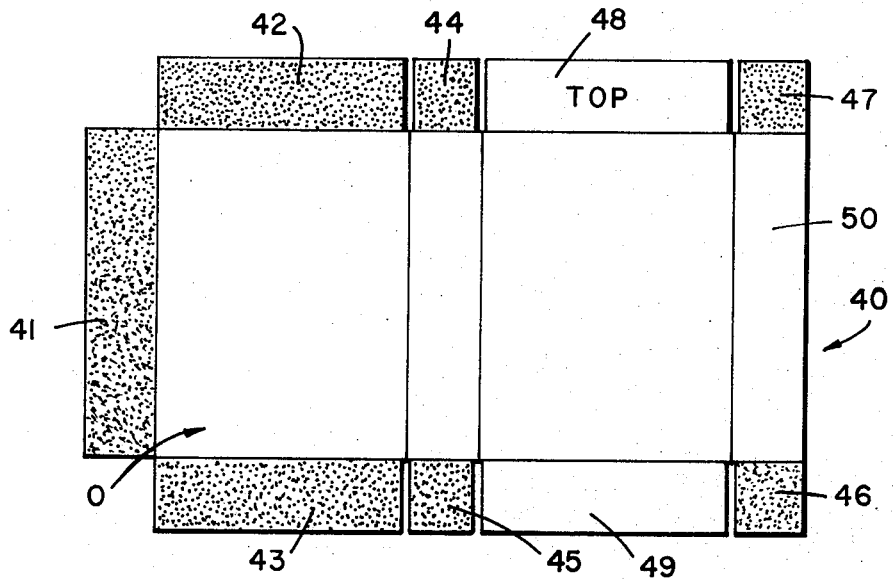
FIG_3
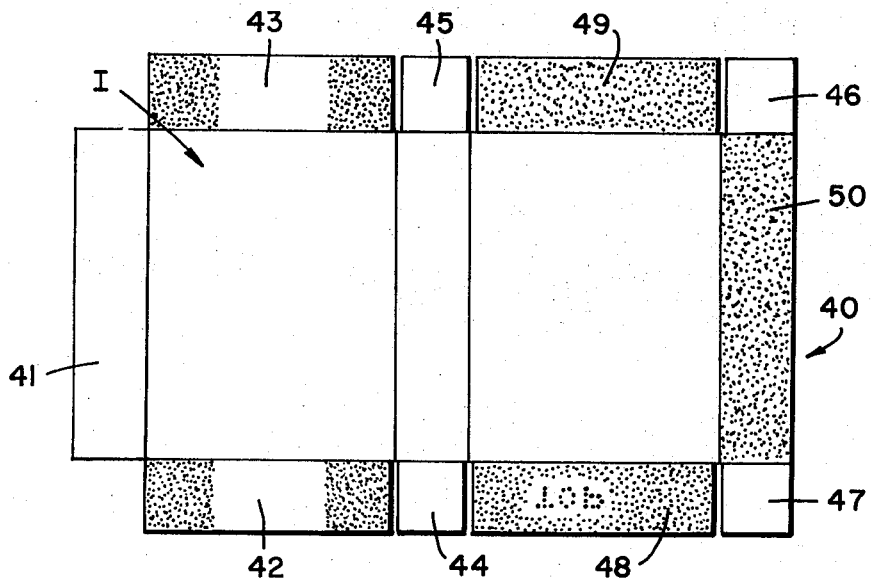
FIG_4
INVENTORS
DAVID R. BAKER
ROBERT I. YIN
BY
ATTORNEYS

United States Patent Office 3,788,876
Patented Jan. 29, 1974

3,788,876
CARTON BLANKS PRINTED WITH A HEAT
SEALABLE COMPOSITION AND METHOD
THEREOF
David R. Baker and Robert I. Yin, Concord, Calif., assignors to Fibreboard Corporation, San Francisco, Calif.
Filed July 16, 1971, Ser. No. 163,335
Int. Cl. A61j 15/06; B44d 1/02
U.S. Cl. 117—38
9 Claims

ABSTRACT OF THE DISCLOSURE

By employing a mixture of powdered polyethylene and an ethylene based ionic polymer in an aqueous emulsion a composition can be formed which can be printed directly on paperboard webs in the locations of the tab and flap areas of a carton blank are subsequently cut therefrom whereby a carton blank is formed which is compatible with high speed barriermatic hot air sealing machines commonly used for fabricating and sealing polyethylene coated carton blanks.

BACKGROUND OF THE INVENTION

Polyethylene coated cartons formed by extruding polyethylene on their surfaces have gained wide acceptance in the pre-packaged food areas, particularly in the frozen food industry, since the polyethylene surface coatings form a barrier, whereby a substantially moisture-proof and easily sealable container or carton is formed for such food. Acceptance of these coated cartons has been enhanced by the ability to print various information on their outer coated surfaces whereby attractive packages can be obtained which do not require an overwrap with wax or other types of overwrapping paper.

Typically, polyethylene is extruded on the surfaces of a paperboard web in a uniform layer from which the carton blanks are cut or blanked in a subsequent blanking operation. Thus, with the exception of the raw edges formed in the blanking operation the blank's surfaces all contain a uniform layer or coating of the polyethylene. Since such coatings are also heat-sensitive adhesives which become tacky when subjected to hot air blasts between 500° F. and 1,000° F., the portions of these cartons which form the flaps or tabs can be subjected to such hot air blasts and lightly presses together to form a strong, durable seal therebetween. U.S. Pat. 3,535,987 issued to Shafer et al. on Oct. 27, 1970, and assigned to the same assignee, illustrates a currently available hot air, heat sealing machine suitable for the extruded polyethylene coated carton blanks wherein the sealing residence times of such cartons in the machine are of the order of 0.1 second after the mating flaps and tabs of the carton blanks have been subjected to the hot air blasts and closed with a pressure from 0.5 to 3 p.s.i. In such a machine the polyethylene coatings in the tabs and flaps are heated to the temperature from 180° F. to 280° F. at the seal interface to obtain the desired bonding and sealing characteristics.

Because of the extremely light pressures needed to close the flaps and tabs onto one another to form a suitable seal, it is not necessary to use a mandrel within the box against which the flaps and tabs must be pressed during sealing or to apply appreciable pressure to the carton structure in order to obtain high interface pressures therebetween. As a result the machines of this type can rapidly assembled extruded polyethylene coated carton blanks into suitable containers and thereafter such containers can be sealed quickly and automatically even though they may be filled with fragile food materials or the like. These characteristics of extruded polyethylene coated carton blanks, in cooperation with machines such as the one illustrated in the above-mentioned patent, have made high speed packaging operations possible with accompanying economies that tend to offset the higher prices of such packages.

In the interest of further economies in application where it is not necessary to have a complete barrier layer or coating in the carton, or those applications wherein the particular packaging application requires that the carton be readily permeable to gasses, such as gas-sterilizable pharmaceutical cartons, it has been found that machines for fabricating and sealing polyethylene coated cartons cannot be employed since the normal extrusion of polyethylene on the limited sealing surfaces of the paperboard web could not be controlled in a suitable manner for applying the polyethylene coating in patches or patterns which were coextensive with the sealing surfaces of the flaps and tabs. Thus a need arose for coatings which could be conveniently applied to the sealing surfaces of these tabs and flaps which would be compatible with the short residence times and light sealing pressures in machines conventionally used for fabricating and closing extruded polyethylene coated cartons with a view to increase the flexibility of such machines representing substantial capital outlays.

Various emulsion systems of dispersed polyethylene having viscosities which allow them to be applied to the flaps and tabs of paperboard cartons by painting, spraying, printing, etc., were found to produce an unsatisfactory seal or to cause problems after the application of the emulsions on the paperboard web, due to protracted drying times. Polyvinyl-acetate emulsions were also applied in a similar manner, but became tacky and blocked unless high molecular weight acetates were used, the latter of which failed to seal at the light sealing pressures and low residence times involved during the machine sealing operations. Other formulations were also investigated including those involving solvent systems, all of which tended to substantiate that when the right sealing characteristics were obtained problems arose in the application of the formulation to the paperboard web from which the carton was ultimately blanked. For example, when formulations of higher molecular weight materials in solvent solutions were employed, the patterns or patches applied to the paper web at the necessary coat-weights could not be dried in a sufficiently short time to avoid handling problems with the web during subsequent carton forming operations.

These experiences with various localized coating systems tended to offset any of the intended or expected economies sought by employing patch or pattern heat sealable coatings on carbon blanks. Thus a situation developed which favored continued use of the extruded polyethylene coated carton blanks were a gas permeable or moisture permeable characteristic in the carton was not required for the particular application, since it allowed the continued use of the high speed capabilities of the currently available machines for fabricating and closing polyethylene coated cartons, thereby avoiding a substantial additional capital investment.

As a result, one of the main objects of the instant invention is to provide a patch or pattern coating on paperboard carton blanks that can be subsequently fabricated and closed in machinery used for handling extruded polyethylene coated carton blanks.

Another object of the invention is the provision of a heat sensitive adhesive composition which can be applied to the flaps and tabs of paperboard cartons that is compatible with the high speed machine operations, normally experienced with extruded polyethylene coated blanks.

Still another object of the instant invention is to obtain additional use from machinery designed for fabricating and closing polyethylene coated carton blanks, with patch or pattern coated carton blanks.

A still further object of the instant invention is the provision of a more economical carton blank where surface barriers in the containers are not required, or by necessity, must not be present.

A very important object of the instant invention also is the provision of a composition which can be "printed" on paperboard webs with conventional printing equipment that can be subsequently heat sealed in a rapid and efficient manner with low residence times and light sealing pressures.

SUMMARY OF THE INVENTION

A printable heat sealable composition which can be applied on paperboard webs by printing patches or patterns thereon forming coatings suitable for subsequent high-speed sealing applications comprises a mixture of powdered polyethylene in an ionic polymer aqueous dispersion wherein the ionic polymer has a carboxyl/carboxylate ratio from 9:1 to 1:9 with a particle size from 0.1 to 0.2 micron and a viscosity range in the neighborhood of 100 centipoises. Normally the aqueous resin dispersion to which the powdered polyethylene is added will have approximately 42% solids representing the ionic polymer present and a solid ratio of powdered polyethylene to ionic polymer is from 100/40 to 30/100.

This composition can be printed directly on paperboard webs with conventional printing machinery, such as by gravure or flexographic processes, to form a carton blank with patches or patterns of the dried composition coextensive with their sealable flaps or tabs when a blanking operation cuts a carton blank from the "printed" paperboard web. The resulting coated flaps and tabs can be heat sealed with residence times in the range of 0.1 second and interfaced pressures from 0.5 to 3 p.s.i.

BRIEF DESCRIPTION OF THE DRAWINGS

For a full and complete understanding of the instant invention reference is made to the attached drawings wherein:

FIG. 1 is a schematic of a paperboard web passing through a flexographic printing process wherein patches or patterns of coating composition are applied to both sides of the web in areas which will subsequently form the sealing flaps and tabs of a carton blank when the latter is subsequently cut from the web;

FIG. 2 is a persepective of the printed web with broken lines illustrating the outline of a carton blank to be subsequently blanked therefrom with shading on its surface representing the patches or patterns of the composition which are printed thereon with the printing process illustrated in FIG. 1;

FIGS. 3 and 4 illustrate a typical carton blank cut from the paper web illustrating the location of the printed patches or patterns of the dried composition by shading on its flaps and tabs; and FIG. 5 is a perspective of the carton formed from the blank shown in FIGS. 3 and 4 assembled for receiving a product prior to closing and sealing the top flaps and tabs thereof.

DESCRIPTION OF AN EMBODIMENT

This instant invention involves a printable heat-sealable composition which is composed of powdered ethylene added to an aqueous dispersion of an ionic polymer that can be printed on paperboard webs in the same manner as inks are applied to paperboard products. As a result, the composition is printed and dried in patches or patterns on paperboard that forms the flaps and tabs of a carton subsequently cut therefrom and which can be fabricated and sealed in the machinery currently used for polyethylene extrusion coated paperboard carton blanks.

The composition is specially formulated for an application by printing techniques and more specifically as described hereinafter. The aqueous resin dispersion of the ionic polymer is commercially available from E. I. du Pont de Nemours and Company, Wilmington, Del., and is sold under the registered trademark "Surlyn." These commercially available dispersions of the ionic polymer contain approximately 42% solids based on the ionic polymer present whose molecular weight varies from 100,000,000 to 200,000,000. In particular products sold as Surlyn® D1070 and D1223 found to have the acceptable characteristics when formulated as disclosed herein. Generally the physical characteristics of the dispersions are as follows:

Solids specific gravity: 0.940
Particle size range: 0.05 to 0.40 micron
Viscosity: 6 r.p.m. 100 centipoise
Co-monomer type: Methylacrylic acid
Carboxyl/carboxylate ratio: 9:1 to 1:9
pH: 8.5–12
Film forming temperatures: 120–170° F.

The general formula for the ionic polymers is

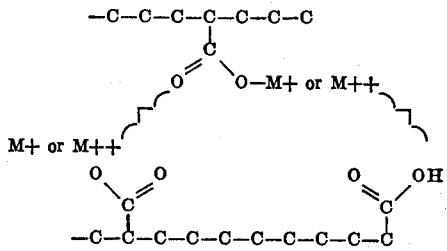

Ionic polymers of this type have in the past been used in heat sealing coating applications on paperboard products or surfaces in coverages from ⅓ to ⅔ pound per thousand sq. ft. The difficulty experienced with these ionic polymers at this coat-weight is that rather high sealing pressures are required on the flaps and tabs, i.e., in the range of 40 p.s.i., to make an acceptable seal. As a result, these ionic polymers which exhibit excellent sealing characteristics were unacceptable for the machinery built for the fabrication and closing of extruded polyethylene coated carton blanks when limited to the lower coatweights. To produce heavier coatweights (i.e., 2–3 lbs./m.s.f.) on conventional flexographic printing equipment requires that the Surlyn® be bodied with fillers to obtain an accpetable transfer and print pattern. In addition at 42% solids considerable water must be removed which increases the drying time and results in a slow down on typical flexographic equipment. The addition of fillers reduces the amount of water to be removed per pound of dry coating.

However, when these ionic polymer dispersions are loaded with powdered polyethylenes as fillers on a solid ratio from 100/40 to 30/100 the desired characteristics for printing application and heat sealing can be obtained along with quick drying characteristics due to increased solids. However on the 100/40 ratio of solids of polyethylene to ionic polymer, some difficulty is experienced in the printing application, which become practically impossible as the ratio of the powdered polyethylene to polymer further exceeds the 100/40 ratio due to the inability to fuse the coatings in typical printing dryers. It is important that the powdered polyethylene have a relatively small particle size in order to form a stable composition. Generally, the size of the particles of this homopolymer should be in the range of 10–30 microns with a melt index (grams/10 minutes) from 5–22. The densities of such powdered polyethylene will range from 0.915 to 0.924 (gram/cubic cm.). Powdered polyethylene having these characteristics can be purchased commercially from U.S.I. Chemicals, as Microthene FN500 and FN510.

To the above polyethylene loaded resin dispersion up to 1.7% by weight of conventional, commercially available defoamers can be added. Commercial defoamer brands such as Drew 474, Drew 913BL etc., have been found acceptable. Also, up to 10% by weight of a low molecular weight alcohol can be added to improve both the wetting and drying characteristics of the composition, if desired. For example, methyl, ethyl, and propyl alcohols are satisfactory.

PRINTABLE HEAT SEALABLE COMPOSITIONS

Composition in an aqueous dispersion:  By weight, percent
- Ionic polymer (Surlyn®) _____ 28–50
- Powdered polyethylene _____ 50–72
- Defoamer _____ 0–7
- Alcohol _____ 0–10

The above composition when printed in patches or patterns behaves substantially identical to extruded polyethylene coated carton blanks when the flaps and tabs of a carton blank are coated with the composition, dried and subsequently processed through machinery built for handling extrusion polyethylene coated carton blanks. Under actual tests sealing residence times in the range of 0.1 second at sealing interface pressures from 0.5–3.0 p.s.i. were found to be completely acceptable where the composition had been applied to the sealing surfaces with coatings as low as one pound per thousand square feet printed thereon. Ususally surface coatings in this technology are expressed in terms of pounds in relation to surface area coated since a uniform coating thickness is applied and therefore its thickness will be determined by the pounds of material applied to the surface. In this regard it was found that the composition when applied in the range of 1–3.5 lbs. per thousand square feet of patch printed surface area worked exceptionally well. Thus, coatings of this new composition having thicknesses less than the thicknesses of the coatings of conventional extruded polyethylene coated carton blanks are suitable for the purposes of this invention.

For convenience hereinafter the above composition shall be identified as "HSX emulsion" for purposes of the remaining description. HSX emulsion is compatible with conventioinal flexographic and gravure printers and FIG. 1 illustrates how a continuous paperboard web 10 is processed through a flexographic printing system 11 in the direction of arrow A via guide roller 12. In this particular embodiment the paperboard web is printed with the HSX emulsion on both sides so that the coating will be applied to the proper surfaces on opposite sides of the resulting carton blank. Thus, in a sense, a dual flexographic press is illustrated. Rubber printing plates attached to rollers 13 which squeeze the web therebetween, transfer the HSX emulsion which has been transferred to their outer surfaces by etch rollers 14 in patches or patterns corresponding to the design (configuration) of the plate. The patterned plates of the print rollers are "inked" with HSX emulsion by etch rollers 14 which contain cells or etches that determine the thickness of the coatings which will be applied to the raised plate surface of the print rollers. In turn, the etch rollers 14 are inked with the HSX emulsion by pickup rollers 15, each of which have a sector emersed in a tank 16 containing the HSX emulsion 17. Each tank has a recirculating pump 18 which agitates the emulsion to ensure uniform consistency of the dispersion is maintained.

After the paperboard web 10 has passed between the print rollers 13 and the HSX emulsion is printed thereon, the web passes through the dryer 20 which is fed with hot air through conduit 21 to dry the printed HSX emulsion patches or patterns on both surfaces of the web. Broken lines 23 and 24 represent the internal drying ovens of the dryer which can employ other drying techniques, as alternatives to the hot air drying or in conjunction, with hot air drying. It should be appreciated that the HSX emulsions can be dried quickly which is another one of its advantages in printing type applications. From the dryer the web passes over a guide roller 25 and then to a carton blanking dye (not shown), or alternatively to a storage roll.

In FIG. 2 the broken line 30 outlines the blank which will be subsequently cut from the paperboard web 10 in a blanking operation with the shaded areas, within the outline of the broken line, representing the pattern or patches of the dried HSX emulsion. While the process for forming these dried patches or pattern on paperboard webs has been discussed with reference to a flexographic type printer, a gravure type printer is also suitable for such type applications. It should also be appreciated that the printing operations need not occur simultaneously and that one surface can be printed at one location and the opposite surface of the web can be printed at another.

A simple carton blank 40 which has been blanked or cut from the paperboard web 10 is illustrated in FIGS. 3 and 4, the former figure illustrating its outside surfaces O and the latter illustrating the inner surfaces I. Through the printing techniques described herein it is possible to accurately locate the patches or patterns of the HSX emulsion on the flaps 41, 42 and 43 as well as the tabs 44, 45, 46 and 47 of the outer surfaces of the carton blank. Similarly, the inner surfaces I of flaps 42 and 43 are patch printed where they will contact the adjacent tabs, with the flaps 48, 49 and 50 being fully covered with the HSX emulsion coating on their inner surfaces.

FIG. 5 illustrates a carton 50 formed with the carton blank 40 with its top open, showing tabs 44 and 47 bending inwardly whereafter flap 42 is folded so as to have localized patches thereon will contact the outer surfaces of the tabs. Thereafter flap 48 is closed downwardly to close the box during sealing. It must be appreciated that the carton blank 40 is merely illustrative of the type of blank that might be formed with the process described herein. Other types of carton blanks are within the purview of this invention, such as the carton blanks for sterile pharmaceutical products, illustrated in United States patent application Ser. No. 833,008, filed by Hugh B. Morse et al. on June 13, 1969, and assigned to the same assignee. This latter type of blank is closed in a manner similar to the top of the paperboard milk carton and the resulting seal obtained with the compositions described herein are equal or superior to those obtained with similar shaped extruded polyethylene coated carton blanks.

A blanking or cutting die for forming the carton blanks is not illustrated since it is a conventional machine and once the paperboard web 10 is properly printed with the HSX emulsion and the emulsion is dried, the paperboard web can be adjusted for proper "timing" in a blanking or cutting die so that the printed patterns will be co-extensive with the flaps or tabs which are cut by the die in the blanking operation. The composition pattern or patches coated on the carton blanks formed by the above process represents an article which can be manufactured more economically and which is compatible with currently available heat sealing machinery used for extruded polyethylene coated carton blanks.

What is claimed is:
1. A carton blank suitable for high speed, low pressure heat sealing machines at residence time in the order of 0.1 second and pressures of 0.5 to 3.0 p.s.i. at temperatures between 180° F. and 280° F. comprising
   a carton blank formed of paperboard and having a plurality of flaps and tabs separated by scorelines which flaps and tabs can be interleaved to form a carbon therefrom; and
   a heat sensitizable composition patch printed and dried on surfaces of the flaps and tabs which are contiguous when they are interleaved to form a carton therefrom said coating including a mixture of powdered polyethylene and ionic polymer by weight in the ratio of 100/40 to 30/100 wherein said ionic polymer has a molecular weight from 100,000,000 to 200,-

000,000 and a carboxyl to carboxylate ratio from 9:1 to 1:9 and wherein said powdered polyethylene has a particle size from 10 to 30 microns, whereby high speed heat sealing equipment can form and seal a carton from said blank at high speeds and low pressures by heat sensitizing said composition which has been patch printed thereon.

2. The carton blank as defined in claim 1 wherein the heat sensitizable composition is composed of from 28 to 50% of the ionic polymer and from 50 to 72% of the powdered polyethylene by weight.

3. A method of producing carton blanks with localized patches of a heat sensitizable composition confined on the surfaces of their sealing flaps and tabs capable of intersealing at temperatures from 180° F. to 280° F. under pressures from 0.5 to 3.0 p.s.i. comprising:

forming an aqueous dispersion of an ionic polymer and powdered polyethylene to form a mixture suitable for conventional printing presses, said aqueous dispersion including a mixture of powdered polyethylene and ionic polymer by weight in the range of a ratio of 100/40 to 30/100 with said ionic polymer having a molecular weight from 100,000,000 to 200,000,000 and a carboxyl to carboxylate ratio from 9:1 to 1:9 and with said powdered polyethylene having a particle size from 10 to 30 microns;

patch printing said mixture on a paperboard web on preselected localized areas thereof, said mixture being applied in coating thickness from 1 to 3.5 pounds/1000 sq. ft. of printed areas;

drying the resulting patch printed localized areas of said mixture on said paperboard web; and blanking and scoring a carton blank from said paperboard web in a manner that said patch printed localized areas will be confined to the surfaces of the flaps and tabs of the resulting carton blank.

4. The method of claim 3 wherein the paperboard web is drawn from a roll for the printing process.

5. The method of claim 3 wherein the patch printed localized areas are restricted to surfaces of the resulting blank that will come into contact when a carton is formed and sealed from the resulting blank.

6. The method defined in claim 3 wherein the mixture has a viscosity of approximately 100 centipoises when printed on the paperboard web.

7. The method defined in claim 6 wherein the mixture is applied to the surfaces of the paperboard web by conventional printing presses.

8. The method of claim 3 wherein the aqueous dispersion includes up to 10% by weight of a low molecular alcohol selected from the group consisting of methanol, ethanol and propanol.

9. The method of claim 3 wherein the aqueous dispersion includes up to 7% by weight of a defoaming agent.

References Cited

UNITED STATES PATENTS

| | | | |
|---|---|---|---|
| 3,291,368 | 12/1966 | Hess | 117—44 |
| 3,301,462 | 1/1967 | Starr | 117—44 |
| 3,394,637 | 7/1968 | Franklin | 117—44 |
| 3,355,319 | 11/1967 | Rees | 117—122 H |

FOREIGN PATENTS

| | | | |
|---|---|---|---|
| 565,382 | 10/1958 | Canada | 117—122 H |

RALPH S. KENDALL, Primary Examiner

M. F. ESPOSITO, Assistant Examiner

U.S. Cl. X.R.

117—44, 122 H, 155 UA

FO-1050
(5/69)

UNITED STATES PATENT OFFICE
CERTIFICATE OF CORRECTION

Patent No. 3,788,876      Dated January 29, 1974

Inventor(s) David R. Baker and Robert I. Yin

It is certified that error appears in the above-identified patent and that said Letters Patent are hereby corrected as shown below:

Column 1, line 68, change "assembled" to --assemble--.

Column 2, line 54, change "were" to --where--.

Column 4, line 46, change "accpetable" to --acceptable--.

Column 5, line 42, change "conventioinal" to --conventional--.

Claim 1, line 8, change "carbon" to --carton--.

Signed and sealed this 13th day of August 1974.

(SEAL)
Attest:

McCOY M. GIBSON, JR.      C. MARSHALL DANN
Attesting Officer           Commissioner of Patents